Aug. 7, 1956  C. M. L. L. BOURCIER DE CARBON  2,757,762
SHOCK ABSORBER
Filed Oct. 22, 1951
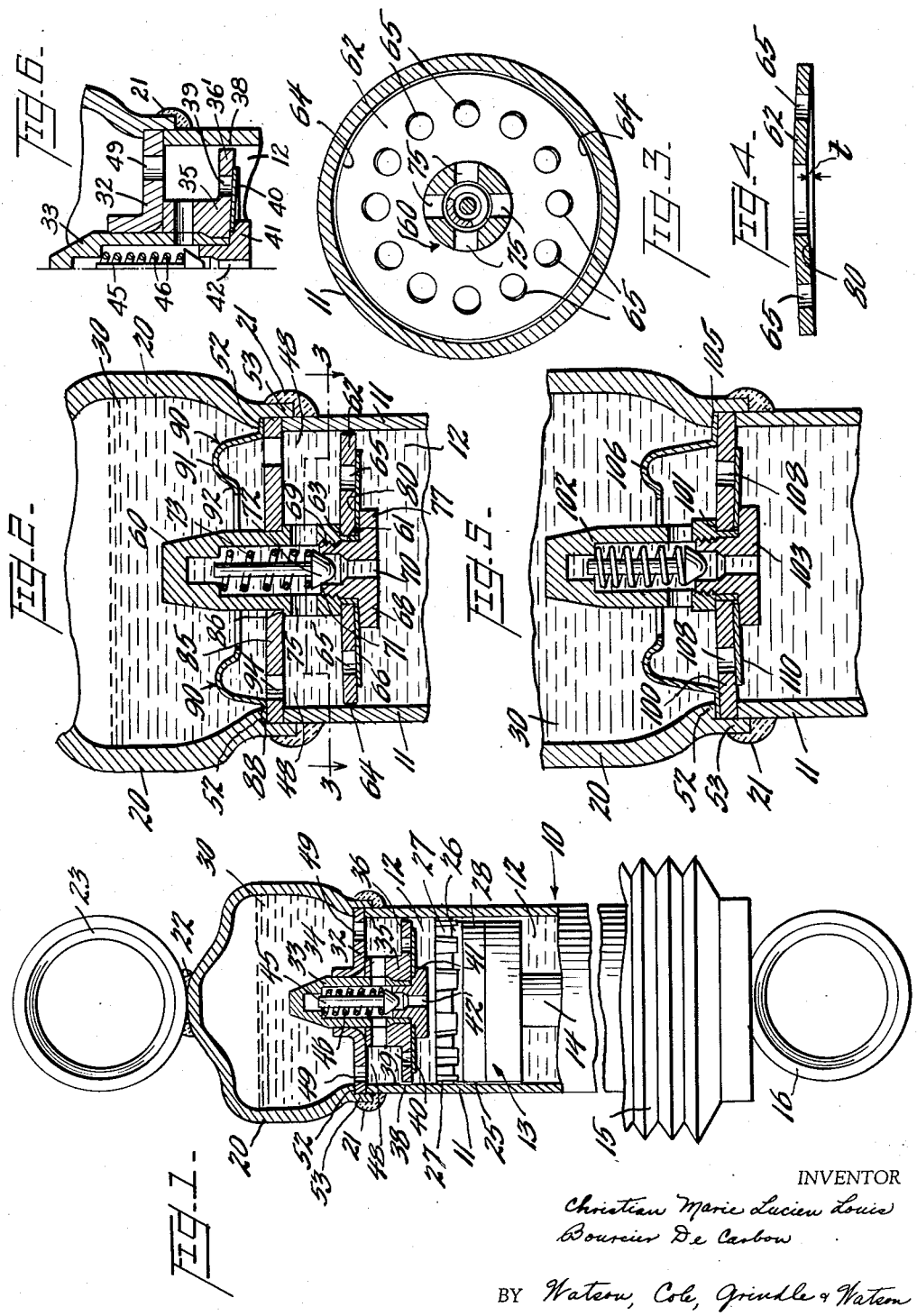
INVENTOR
Christian Marie Lucien Louis
Bourcier De Carbon
BY Watson, Cole, Grindle & Watson
ATTORNEYS United States Patent Office 2,757,762
Patented Aug. 7, 1956

2,757,762

SHOCK ABSORBER

Christian Marie Lucien Louis Bourcier de Carbon,
Neuilly-sur-Seine, France

Application October 22, 1951, Serial No. 252,488

11 Claims. (Cl. 188—100)

This invention relates to shock absorbers and more particularly to shock absorbers of the direct-acting fluid-displacement type adapted especially for use on automotive vehicles.

Generically the objects of the invention are broadly the same as those of the inventions disclosed in the co-pending application Serial No. 145,788, filed February 23, 1950, now Patent No. 2,719,612, and in the parent application Serial No. 22,836, filed April 23, 1948, and now abandoned, of which that application is a continuation-in-part.

Specifically, it is an object of the present invention to provide certain optionally usable variations in the shock absorbers which comprised the subject matter of the prior application, these changes serving to improve the strength, durability, efficiency and safety of operation of the shock absorber under various conditions of use, and also facilitating the production of the shock absorber on a mass scale.

The improvements afforded by the invention have more particularly to do with certain novel details of the expansion reservoir or anti-cavitation chamber of the shock absorber. It will be understood from a perusal of the above mentioned applications that the general type of shock absorber to which this invention relates, involves the provision of a fluid chamber disposed in the casing at a position above the working chamber in which the piston reciprocates, this expansion or reserve chamber being adapted to contain a supply of working fluid held in ready availability for keeping the working chamber full of liquid at all times, thus preventing the formation of voids or air pockets, which would seriously interfere with the efficient operation of the shock absorber. Also, as is well known in the art, the piston rod as it enters the working chamber displaces liquid therefrom, and thus the expansion chamber serves to accommodate this displaced fluid, receiving it through certain spring-resisted valving means, and readily giving it up to the working chamber, upon retraction or withdrawal of the piston rod, through valving of very slight resistance. The valving for both directions of flow is appropriately selected or adjusted with relation to the rate of displacement of liquid past the piston so as to prevent cavitation at any expected piston velocity.

Obviously, the reservoir chamber also takes care of any thermal expansion of the body of working fluid.

One distinctive feature of the shock absorbers disclosed in the prior applications to which reference has been made, is the attachment of the cylinder or working chamber of the shock absorber to the body or chassis of the vehicle and the piston rod to the wheel mounting. This arrangement ensures that the body of liquid carried in the cylinder is supported by the sprung weight and is therefore not subjected to the continual and sometimes violent vibrations of the unsprung wheel and axle assemblies. This provision prevents emulsification and foaming of the working liquid to a large extent, and it is another object of the present invention to provide certain baffle and diverter features which will further aid in maintaining the body of liquid especially within the reservoir at the top of the working cylinder and adjacent the surface of the liquid, in a relatively quiescent state and free from excess turbulence or splashing.

Additionally, the invention has for its object the provision of improved return flow valving means for the anti-cavitation chamber or reservoir.

A further object is the provision of novel and ingenious structural features of the shock absorber reservoir assembly which not only strengthen and improve the partitioning and supporting means of the shock absorber but greatly facilitate its rapid and economical production.

It is also within the contemplation of the present invention to provide novel and improved methods of manufacture and assembly of shock absorbers of this type.

Other objects and features of novelty will be apparent from the following specification when read in connection with the accompanying drawings in which certain embodiments of the invention are illustrated by way of example.

In the drawings:

Figure 1 is a view in elevation of a shock absorber embodying the principles of the invention, certain parts being broken away and other more pertinent ones shown in vertical section;

Figure 2 is a similar view on an enlarged scale showing certain optional variations in the construction and arrangement of the reservoir and anti-cavitation features of the shock absorber;

Figure 3 is a horizontal sectional view taken on line 3—3 of Figure 2;

Figure 4 is a view in vertical section of the reservoir partition plate, showing in somewhat exaggerated degree the taper or conical configuration of the plate;

Figure 5 is a vertical sectional view of a still further modification of the novel shock absorber; and Figure 6 is a fragmentary view in half-section of an embodiment exactly the same as Figure 1 with the exception that the spring valve contacting surface is conical as in the other figures.

Referring now more particularly to Figure 1 of the drawings it will be seen that the shock absorber indicated generally by the numeral 10, comprises the cylindrical casing 11, the interior of which is taken up for the most part by the working chamber 12 which contains a suitable working fluid consisting preferably of the usual liquids of optimum viscosity and coefficients of expansion. Disposed for vertical reciprocation within the working chamber 12 is the piston 13 which is provided with a piston rod 14 which passes through suitable packing arrangements at the lower end of the cylinder and is adapted to be shielded and protected by the accordion sleeve or bellows 15. The lower end of the piston rod is provided with an attaching ring or loop 16 which is rigidly secured thereto as by welding and which is adapted to surround a suitable pin or coupling element carried by the wheel mounting and is provided with suitable cushioning elements such as the rubber grommets in general use in connection with this type of shock absorber.

The upper portion of the shock absorber comprises a dome-like cap 20 which is rigidly secured to the upper rim of the cylinder 11 as by means of the welding 21. The details of the connection of the cap with the cylinder and the coincidental support of other parts of the shock absorber will be described presently. The cap 20 is bulged slightly, being of a somewhat greater diameter than the tubular cylindrical body portion 11. This is done in order to provide enlarged capacity for the reservoir for a given length of shock absorber and also in order to provide space and suitable contour for the diversion of certain currents which may be set up in the liquid, laterally within the chamber rather than directly upwardly toward the surface thereof.

To the central portion of the top of the dome or cap 20 there is welded as at 22 a loop or ring 23 which is adapted to be attached to securing means carried by the chassis or body of the vehicle, and to receive a cushioning grommet in the usual way.

Reference to the copending applications already mentioned, will disclose that the piston 13 is provided with certain by-pass means which in those embodiments comprise both internal valve control passageways and a marginal annular laminar clearance space around the piston, this latter by-pass means being indicated in the present drawings at 25. Incidentally, the upper portion of the piston is provided with a guide flange which is interrupted or serrated to enable the liquid which passes through the laminar passageway 25 to enter and leave the portion of the working chamber 12 which is above the piston without increased restriction. This guide ring is indicated at 26 in the drawings and the separated portions 27 which slide against the inner wall of the cylinder and serve to guide and center the piston are clearly indicated. One feature which characterizes the shock absorbers disclosed in the copending applications and which therefore does not form a part of the present invention, is the thermostatic ring or band 28 which surrounds and is carried by the piston and which serves to restrict the annular laminar clearance space 25 in accordance with variations in temperature and thus compensate for changes in the viscosity of the working fluid.

The gist of the present invention lies in the provisions for partitioning the expansion reservoir or anti-cavitation chamber 30 which lies mainly within the cap or dome 20 of the casing from the working chamber 12. The invention also involves the means for valving the fluid passing into and from the reservoir as well as the provision of novel anti-splashing baffle means for diverting the flow and preventing excess emulsification or foaming. The embodiment of these features in Figure 1 of the accompanying drawings is somewhat similar to that one shown in Figure 10 of application Ser. No. 145,788 in that there is provided a baffle plate 32 which extends all the way across the diameter of the cylindrical portion of the casing and which is rigidly secured to the stud 33 which encloses the valving which controls the flow of fluid from the working chamber 12 into the reservoir 30, the plate 32 being provided with a central flange 34 having a forced fit with the walls of the stud 33.

Rigid with the stud 33 is the partition member 35 which has a central tubular body portion receiving the lower end of the stud 33 with a forced fit. The member 35 has a flared flange or plate portion 36 which extends almost to the walls of the casing but is spaced therefrom to provide a very thin laminar annular clearance space 38. The plate is perforated as at 39 to provide a circular series of openings through which the fluid may pass through the lower portion of the chamber of the reservoir 30 back into the working chamber 12. Back flow through the openings 39 from the working chamber 12 is prevented by the spring valve disc 40 which is secured against the underside of the partition plate or flange 36 by means of the cavitation plug 41 which is threaded or forced into the open lower end of the stud 33. The plug 41 is provided with a central opening or passageway 42 which widens upwardly and terminates in a valve seat against which the valve element 45 is pressed by the coil spring 46. The aligned passageways in the wall of the stud 33 and in the central tubular portion of the member 35 provide escape means from the center of the stud 33 to the space 48 comprising the lowermost portion of the reservoir or expansion chamber 30, this portion lying below the baffle plate 32. The baffle plate 32 is provided with an annular series of openings 49 through which fluid from the space 48 may pass to the upper portion of the reservoir. It will be noted that the liquid passing the valve 45 is directed radially outwardly through the lateral passageways into the space 48 and the velocity of the jets is broken by the sharp change in direction through the passageways 49 into the major portion of the reservoir 30. In issuing through the openings 49 the fluid may pass somewhat outwardly and follow the bulging walls of the dome or cap 20, instead of jetting vertically upwardly alongside of a straight vertical wall and in this way excess splashing of liquid at the surface of the body of liquid contained in the reservoir is prevented.

One of the features of the invention which improves the construction of the shock absorber and facilitates its production is the association of the baffle plate 32 with the cap member 20 and the body cylinder 11 of the shock absorber. The downwardly opening mouth of the cap or dome element 20 is of somewhat greater diameter and thickness than the wall of the cylindrical body portion 11. Also, this mouth flange of the cap 20 is shouldered as at 52 and has an enveloping downwardly extending flange 53 adapted to enclose the upper edge of the tubular casing element 11. The margins of the baffle plate 32 are gripped between the shoulder 52 and the end of the tubular member 11 and when the cap is securely welded into place as by the weld 21, the baffle 32 and consequently the unitary partition-baffle-valving assembly is rigidly secured in place. At the same time by careful and accurate machining of the parts and the rigid fitting thereof, the depending partition plate 36 is fixed at the proper minute marginal spacing 38 from the walls of the working chamber 12.

In practice, after the stud 33, partition member 35, plug 41, and baffle-supporting plate 32 are fitted together, this partitioning assembly is applied to the open mouth of the cap 20 within the flange 53 and against the shoulder 52 and then the tubular portion 11 of the body cylinder of the shock absorber is fitted to the flange 53 and the welding 21 applied around the annular junction of these parts.

It will be clearly understood how the assembled shock absorber illustrated in Figure 1 operates. Upon contraction of the springs when the wheel mounting and the chassis approach each other, the piston 13 moves upwardly within the working chamber 12, fluid being displaced from the upper portion of the chamber 12 through and around the piston into the lower portion. However, the total available volume of the working chamber 12 is reduced by the introduction of more and more of the piston rod 14 into the working chamber. The displaced fluid must then pass through the central opening 42 in the plug 41 past the valve 45 in opposition to the spring 46, outwardly through the radial passageways in the member 35, and thence into the expansion chamber 48, 30. Upon retraction of the piston 13 during the rebound stroke, the piston rod 14 is withdrawn from the cylinder and the displaced portion of the liquid returns from the expansion chamber 30, 48 through the series of radial openings 39 past the spring disc valve 40, which offers very little resistance to the return flow since it is of importance in the operation of the shock absorber that the displaced fluid be quickly returned to the working chamber.

For purposes which are more fully explained in the above mentioned copending application, the marginal clearance 38 is provided around the partition plate 36 to permit certain laminar flow into and out of the reservoir or expansion chamber during the reciprocating movements of the piston, comparable to the flow through the annular space 25 around the piston from one portion of the working chamber to the other. These provisions which form an important feature of the invention covered in the prior application, afford a resistance to piston movement or a braking effect in absorbing the shocks, which is quite different from the kinetic braking resulting from the flow of working fluid through small openings or passageways through the body of the piston or partition wall. The underlying theory basing this provision is fully described in the prior application and need not be reiterated here.

The embodiment illustrated in Figures 2, 3 and 4 of the drawings incorporates certain variations in the basic structure shown in Figure 1, but it is to be clearly understood that these features either individually or collectively, may be applied selectively to the device shown in Figure 1 as desired. In this second embodiment of the invention the essential basic parts are designated by the same reference characters as those used in describing the earlier embodiment, the cylindrical casing being indicated at 11, the working chamber at 12, and the cap or dome member at 20. The main portion of the reservoir or expansion chamber is shown at 30 and the lower portion just inwardly of the partition is indicated by the numeral 48. The cap is also shouldered as at 52 and provided with a downwardly extending flange 53 which is welded to the cylinder 11 as at 21.

In this embodiment, the construction of the partition, valving and baffle assembly is somewhat different in its details. The stud 60 is provided with an annular depending flange 61 at its lower end which is forced into the central opening in the partition plate 62, this plate abutting a downwardly facing shoulder 63 on the stud. The periphery of the partition plate 62 has an annular laminar marginal clearance space 64 just as in the case of the previously described embodiment.

The partition plate is provided with the annular series of openings 65 and a spring disc valve 66 controls the flow through these openings, preventing upward flow and readily permitting downward flow therethrough. The plug 68 is threaded as at 69 into the interior of the stud 60 and this plug is provided with a central opening 70 and the upwardly disposed valve seat 71 controlled by the valve 72 which is urged toward seated position by the coil spring 73. Flow past the valve into the reservoir occurs through the radial openings 75 in the walls of the stud. The outwardly directed flanges 77 of the plug 68 serve to secure the inner portions of the spring disc valve 66 in position and urge it against the underside of the partition plate 62.

One novel feature shown in Figures 2 and 4 of the drawings, and which, as explained above, may be selectively incorporated in any other embodiment of the invention will now be described. This feature contemplates the provision of a concave or somewhat conical lower face 80 on the partition plate 62. This configuration is clearly indicated in Figure 4 of the drawings by a slight exaggeration of the degree of tapering but will emphasize the graphic showing of this feature. This arrangement has important advantages in the efficient operation of the shock absorber. Occasionally, when a flat faced partition was employed the spring disc valve applied thereto did not effectively close the annular series of openings in the partition. One reason is that after the shock absorber has been in use for a short period of time a film of shock absorber fluid may be trapped between the lower surface of the partition and the valve disc around the center of these parts. This occasionally prevented the effective closing of the disc valve leaving a gap between the valve and the partition and some of the working fluid passed into the reservoir or anti-cavitation chamber when the piston moved upwardly. Of course, this condition would defeat the purpose of the anti-cavitation reserve chamber both in respect to its function in affording a reserve for thermal expansion of the fluid as well as for receiving the exact amount of fluid displaced by the entering portion of the piston rod. The consequence would be that there would be more fluid passed into the reserve chamber than necessary and when the piston reversed its travel cavitation would occur.

Another reason for applying this new configuration to the partition valve face is that in the case of a flat face and disc valve, particles of material such as welding flux or the like would occasionally, no matter how much care was employed to prevent it, deposit between the bottom of the partition and the valve disc or diaphragm, which would aggravate the above described condition very greatly. In order to obviate these difficulties the base of the cavitation chamber was made concave on its underside. This ensures a pre-tensioning of the valve disc or diaphragm so that no fluid film or other foreign particles will urge it to open position during upward flow of the fluid. This provision has been found to improve the ride of the vehicles in which this shock absorber is employed when running over washboard roads, and has aided greatly in eliminating wheel hop.

Merely as an example of the small degree of taper applied to the partition plate, but not in any limiting sense as regards the scope of the invention, it may be stated that in one partition of approximately 1.43" in diameter, the taper applied was sufficient to make the inner displacement $t$ in Figure 4 of the drawings of a value of from about 0.007" to about 0.009". An angle of taper of say from about 30' to about 1° will be satisfactory.

As stated above, certain of the features shown in the embodiments illustrated in Figures 2–5 of the drawings may be incorporated in the disclosure of Figure 1, within the intention and scope of the present invention, and an example of this is illustrated in Figure 6 of the drawings in which the assembly of the cavitation elements is exactly the same as in Figure 1 with the exception that the flange 36' has a generally conical undersurface against which the spring valve seats.

Referring further to Figure 2 of the drawings it will be seen that the baffle plate 85, which also serves as the supporting element for the entire partition assembly, is provided with a simple circular opening at its center and is not flanged but is forced upon the intermediate portion of the stud 60 up against the shoulder 86 and the parts thus firmly united. The margins of the baffle plate 85 are seized between the shoulder 52 of the cap 20 and the upper edge of the cylinder 11, and in between the plate and the shoulder 52 is disposed the flange 88 of the diverter element 90. This element is of an annular curved section having an upwardly rounded or curved configuration 91 and terminating in a short inner marginal flange 92 leaving an opening between the edge of this last named flange and the stud 60. The effect of the diverter is to prevent a jet of fluid issuing from the lower portion 48 of the reservoir through the opening 94 in the baffle 85 up to and through the upper surface of the fluid and thus cause splashing and emulsification. The fluid passing through the openings 94 strikes the curved portion of the diverter 90 and passes inwardly of the chamber and then upwardly beyond the inner margin of the flange 92 into the main portion of the reservoir 30 and by this time the jets have lost much of their force and will not break through the surface of the fluid and cause foaming or intermingling with air.

In the embodiment illustrated in Figure 5 of the drawings, there is shown a modified form of the invention in which the supporting plate and reservoir partition assembly are combined in one single plate 100, this plate being clamped between the shoulder 101 of the stud 102 and the flanges of the plug 103. The central passageways and valving are the same as in the other figures and will not be again described in connection with this one. The cap is indicated at 20, the reservoir at 30, the cylindrical body casing of the shock absorber is shown at 11, and it will be understood that the configuration of the interfitting parts 20 and 11 is similar to the ones previously described and includes the abutting shoulder 52, the depending flange 53 and the weld 21. In this case, however, the return valving is in the plate 100 which is clamped between the casing rim 11 and the shoulder 52 along with the flange 105 of the diverter 106. Openings 108 in the plate serve to permit return flow of the fluid as controlled by the relatively thin valve disc 110.

It is understood that various changes and modifications may be made in the embodiments illustrated and described herein without departing from the scope of the invention as determined by the following claims.

Having thus described the invention, what is claimed as new and desired to be secured by Letters Patent is:

1. A direct acting shock absorber for controlling the relative movements of two members, said shock absorber comprising a substantially cylindrical casing secured to one of said members and adapted to occupy a substantially vertical position when in use, said casing containing a cylindrical working chamber, a piston adapted to reciprocate in said working chamber upon relative movement of said members, a piston rod having one of its ends fixed to said piston and its opposite end connected to the other of said members, said rod extending from the lower side only of said piston and passing through the lower end of said cylindrical casing, an expansion chamber in the upper end of said casing, a quantity of liquid filling said working chamber and part of said expansion chamber, a transverse partition disc separating said working chamber from said expansion chamber, fluid passages through said disc through which said liquid may pass from one of said chambers to the other, a perforated rigid disc-like transverse plate fixedly secured at its periphery to the walls of said casing and spaced vertically from said partition disc, rigid means extending axially from said plate and fixed to said disc for supporting the latter from the plate, said partition disc being marginally spaced from the walls of said casing, and said plate being the sole means for supporting said disc within the casing.

2. A direct acting shock absorber for controlling the relative movements of two members, said shock absorber comprising a substantially cylindrical casing secured to one of said members and adapted to occupy a substantially vertical position when in use, said casing containing a cylindrical working chamber, a piston adapted to reciprocate in said working chamber upon relative movement of said members, a piston rod having one of its ends fixed to said piston and its opposite end connected to the other of said members, said rod extending from the lower side only of said piston and passing through the lower end of said cylindrical casing, an expansion chamber in the upper end of said casing, a quantity of liquid filling said working chamber and part of said expansion chamber, a transverse partition disc separating said working chamber from said expansion chamber, fluid passages through said disc through which said liquid may pass from one of said chambers to the other, a perforated rigid disc-like transverse plate fixedly secured at its periphery to the walls of said casing and spaced upwardly from said partition disc, rigid means extending axially downwardly from said plate and fixed to said disc for supporting the latter from the plate, said plate being disposed within said expansion chamber beneath the surface of the liquid therein and serving both as a baffle for controlling turbulence in the expansion chamber and as a supporting spider for said partition disc.

3. A direct acting shock absorber for controlling the relative movements of two members, said shock absorber comprising a substantially cylindrical casing secured to one of said members and adapted to occupy a substantially vertical position when in use, said casing containing a cylindrical working chamber, a piston adapted to reciprocate in said working chamber upon relative movement of said members, a piston rod having one of its ends fixed to said piston and its opposite end connected to the other of said members, said rod extending from the lower side only of said piston and passing through the lower end of said cylindrical casing, an expansion chamber in the upper end of said casing, a quantity of liquid filling said working chamber and part of said expansion chamber, a transverse partition disc separating said working chamber from said expansion chamber, fluid passages through said disc through which said liquid may pass from one of said chambers to the other, a perforated rigid disc-like transverse plate fixedly secured at its periphery to the walls of said casing and spaced upwardly from said partition disc, rigid means extending axially downwardly from said plate and fixed to said disc for supporting the latter from the plate, said plate being disposed within said expansion chamber beneath the surface of the liquid therein, and serving both as a baffle for controlling turbulence in the expansion chamber and as a supporting spider for said partition disc, and an annular cupped diverter element also supported by said plate and disposed within the liquid in said expansion chamber to further control jetting of liquid entering said expansion chamber and minimizing foam-producing turbulence.

4. A direct acting shock absorber for controlling the relative movements of two members, said shock absorber comprising a substantially cylindrical casing secured to one of said members and adapted to occupy a substantially vertical position when in use, said casing containing a cylindrical working chamber, a piston adapted to reciprocate in said working chamber upon relative movement of said members, a piston rod having one of its ends fixed to said piston and its opposite end connected to the other of said members, said rod extending from the lower side only of said piston and passing through the lower end of said cylindrical casing, an expansion chamber in the upper end of said casing, a quantity of liquid filling said working chamber and part of said expansion chamber, a transverse partition disc separating said working chamber from said expansion chamber, fluid passages through said disc through which said liquid may pass from one of said chambers to the other, a perforated rigid disc-like transverse plate fixedly secured at its periphery to the walls of said casing and spaced upwardly from said partition disc, rigid means extending axially downwardly from said plate and fixed to said partition disc for supporting the latter from the plate, said axially extending means comprising a stud having a force fit within a central opening in said plate and a force fit within a central opening in said disc, said partition disc being marginally spaced from the walls of said casing, and said plate being the sole means for supporting said disc.

5. A direct acting shock absorber for controlling the relative movements of two members, said shock absorber comprising a substantially cylindrical casing secured to one of said members and adapted to occupy a substantially vertical position when in use, said casing containing a cylindrical working chamber, a piston adapted to reciprocate in said working chamber upon relative movement of said members, a piston rod having one of its ends fixed to said piston and its opposite end connected to the other of said members, said rod extending from the lower side only of said piston and passing through the lower end of said cylindrical casing, an expansion chamber in the upper end of said casing, a quantity of liquid filling said working chamber and part of said expansion chamber, a transverse partition disc separating said working chamber from said expansion chamber, fluid passages through said disc through which said liquid may pass from one of said chambers to the other, a perforated rigid disc-like transverse plate fixedly secured at its periphery to the walls of said casing and spaced axially from said partition disc, rigid means extending axially from said plate and fixed to said disc for supporting the latter from the plate, said axially extending means comprising a hollow stud having a force fit within a central opening in said plate and a force fit within a central opening in said disc, said plate being the sole means for supporting the disc, and a one-way valve controlled passageway in said hollow stud through which liquid displaced from said working chamber to said expansion chamber may by-pass the partition disc, and one-way valve means controlling the fluid passages through said disc to permit return flow from said expansion chamber to said working chamber only.

6. A direct acting shock absorber for controlling the relative movement of two members, said shock absorber comprising a casing enclosing a working chamber and having a reservoir or expansion chamber within one end thereof, a piston disposed for reciprocation in said working chamber, and a piston rod having one end connected to said piston and its intermediate portion extending through the end of said casing opposite to the end occupied by said expansion chamber, means for connecting said casing to one of said members and the projecting end of said piston rod to the other; said casing comprising a first substantially cylindrical part and a second cup-like end-forming part, said parts being joined together in the vicinity of the boundary between said working chamber and said expansion chamber, said second part having an internally shouldered skirt terminating in an outwardly disposed axially extending flange, said flange snugly enveloping the end portion of the annular wall of said first part, the end edge of said first part being in confronting relationship to the shoulder of said second part, a transverse perforated baffle and supporting plate extending across said casing and having its peripheral margin seized between said confronting end and shoulder portions of the respective casing parts, and a weld securing said parts together at said flange, a stud extending axially from said plate, and a valved partition disc supported from said stud in spaced parallel relationship to said plate, said partition disc dividing the interior of said casing into said working and expansion chambers.

7. A direct acting shock absorber for controlling the relative movement of two members, said shock absorber comprising a casing enclosing a working chamber and having a reservoir or expansion chamber within one end thereof, a piston disposed for reciprocation in said working chamber, and a piston rod having one end connected to said piston and its intermediate portion extending through the end of said casing opposite to the end occupied by said expansion chamber, means for connecting said casing to one of said members and the projecting end of said piston rod to the other; said casing comprising a first substantially cylindrical part and a second cup-like end-forming part, said parts being joined together in the vicinity of the boundary between said working chamber and said expansion chamber, said second part having an internally shouldered skirt terminating in an outwardly disposed axially extending flange, said flange snugly enveloping the end portion of the annular wall of said first part, the end edge of said first part being in confronting relationship to the shoulder of said second part, a transverse perforated plate extending across said casing and having its peripheral margin seized between said confronting end and shoulder portions of the respective casing parts, and a weld securing said parts together at said flange, a fluid-current diverter ring having a radial flange also seized between said named confronting portions along with said plate margin, and an annular inwardly disposed dished portion of said ring within the body of liquid in said expanson chamber.

8. A direct acting shock absorber for controlling the relative movement of two members, said shock absorber comprising a casing enclosing a working chamber and having a reservoir or expansion chamber within one end thereof, a piston disposed for reciprocation in said working chamber, and a piston rod having one end connected to said piston and its intermediate portion extending through the end of said casing opposite to the end occupied by said expansion chamber, means for connecting said casing to one of said members and the projecting end of said piston rod to the other; said casing comprising a first substantially cylindrical part and a second cup-like end-forming part, said parts being joined together in the vicinity of the boundary between said working chamber and said expansion chamber, said second part having an internally shouldered skirt terminating in an outwardly disposed axially extending flange, said flange snugly enveloping the end portion of the annular wall of said first part, the end edge of said first part being in confronting relationship to the shoulder of said second part, a transverse perforated baffle and supporting plate extending across said casing and having its peripheral margin seized between said confronting end and shoulder portions of the respective casing parts, and a weld securing said parts together at said flange, a stud extending axially from said plate, and a valved partition disc supported from said stud in spaced parallel relationship to said plate, said partition disc dividing the interior of said casing into said working and expansion chambers, a fluid-current diverter ring having a radial flange also seized between said named confronting portions along with said plate margin, and an annular inwardly disposed dished portion of said ring within the body of liquid in said expansion chamber.

9. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; said partition wall comprising a transverse disc extending across the interior of said casing and provided with an annular series of openings therethrough, said series spaced from the center and the periphery of the disc; a thin resilient disc valve secured centrally to said partition disc so as to normally lie snugly against the surface of said disc, which surface bounds the working chamber, and to prevent flow of fluid through said openings from said working chamber to said expansion chamber; other valving means for permitting flow of fluid from the working chamber to the expansion chamber; the said surface of the partition disc being concave, whereby the disc valve is initially and normally under slight tension so that the snugness of the application of the disc valve against said surface is assured.

10. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; said partition wall comprising a transverse disc extending across the interior of said casing and provided with an annular series of openings therethrough, said series spaced from the center and the periphery of the disc; a thin resilient disc valve secured centrally to said partition disc so as to normally lie snugly against the surface of said disc, which surface bounds the working chamber, and to prevent flow of fluid through said openings from said working chamber to said expansion chamber; a centrally disposed opening through the partition disc and a spring pressed valve controlling said opening to permit flow of fluid from the working chamber to the expansion chamber but to prevent back-flow therethrough; the said surface of the partition disc being conically concave, whereby the disc valve is initially and normally under slight tension so that the snugness of the application of the disc valve against said surface is assured.

11. A direct acting shock absorber for controlling the relative movement of two members, said shock absorber comprising a casing enclosing a working chamber and having a reservoir or expansion chamber within the upper end thereof, a piston disposed for reciprocation in said working chamber, and a piston rod having its upper end connected to said piston and its intermediate portion extending through the lower end of said casing opposite to the end occupied by said expansion chamber, means for connecting said casing to one of said members and the projecting end of said piston rod to the other; a transverse partition means extending across the interior of said cylinder above said piston to separate said working chamber and said reservoir or expansion chamber, fluid passageways through portions of said partition member for the transfer of fluid in one direction or the other upon corresponding movement of said piston, means within said reservoir above said partition means for diverting fluid currents and jets within said reservoir due to sudden injection of working fluid into the reservoir through said partition means, said diverting means comprising an annular inverted cupped element having its radial outer margins fixedly supported by the walls of said casing in the vicinity of said partition means and above the latter, its intermediate portion bowed upwardly and thence downwardly and radially inwardly toward the axis of the casing where it terminates in a circular margin of a central opening for discharge of fluid into the reservoir proper.

References Cited in the file of this patent

UNITED STATES PATENTS

| | | |
|---|---|---|
| 2,060,590 | Padgett | Nov. 10, 1936 |
| 2,087,451 | Rossman et al. | July 20, 1937 |
| 2,089,657 | Mercier | Aug. 10, 1937 |
| 2,342,381 | Thornhill | Feb. 22, 1944 |
| 2,410,176 | Magrum | Oct. 29, 1946 |
| 2,496,952 | Mercier | Feb. 7, 1950 |
| 2,507,266 | Patriquin | May 9, 1950 |
| 2,576,637 | Patriquin | Nov. 27, 1951 |

FOREIGN PATENTS

| | | |
|---|---|---|
| 595,592 | France | July 20, 1925 |
| 995,003 | France | Aug. 14, 1951 |
| 629,565 | Great Britain | Sept. 22, 1949 |
| 632,496 | Great Britain | Nov. 28, 1949 |
| 331,444 | Italy | Nov. 6, 1935 |